UNITED STATES PATENT OFFICE.

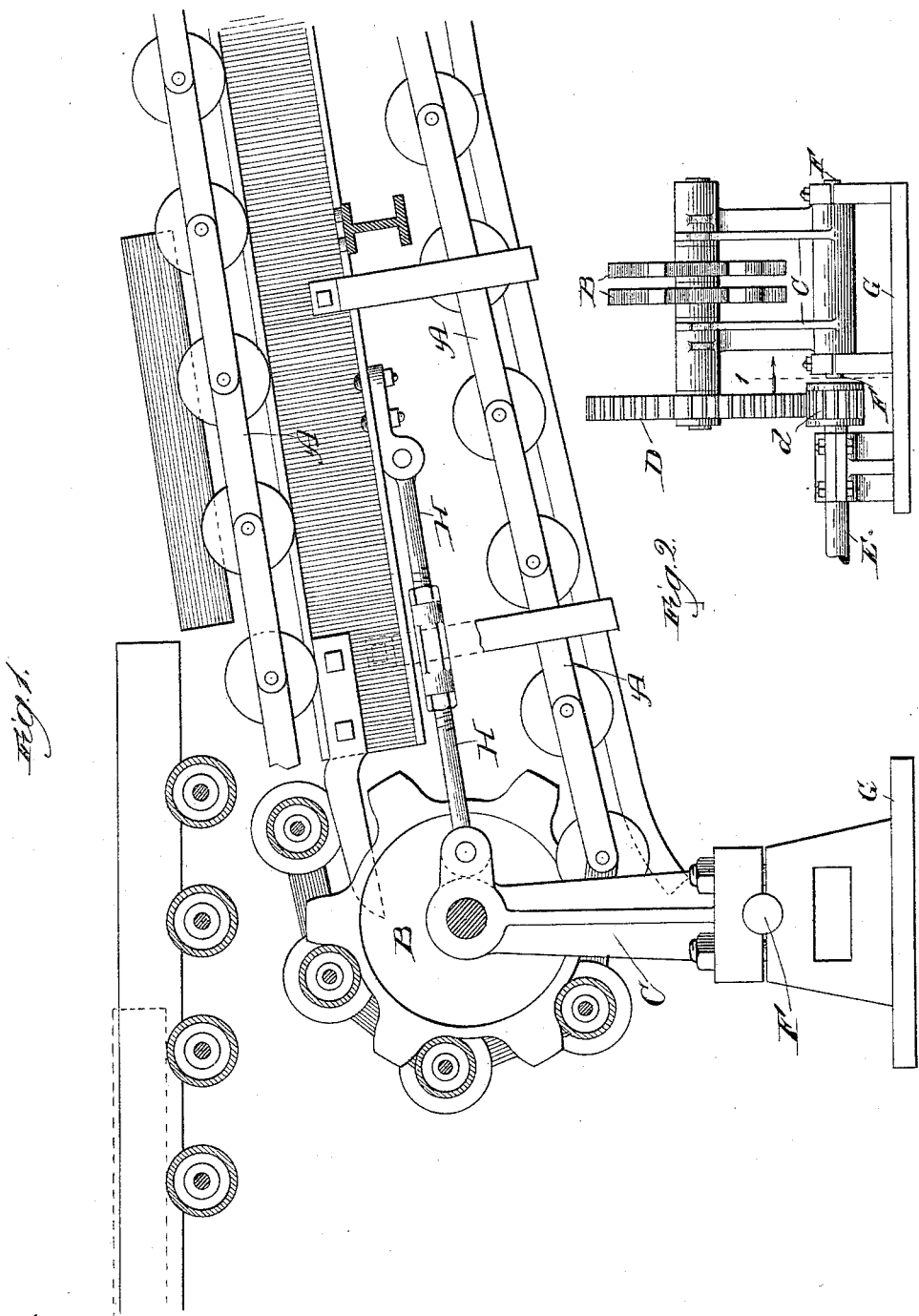

FRANCIS H. TREAT, OF CHICAGO, ILLINOIS, ASSIGNOR TO THE ILLINOIS STEEL COMPANY, OF SAME PLACE.

BILLET-CONVEYER.

SPECIFICATION forming part of Letters Patent No. 445,292, dated January 27, 1891.

Application filed August 16, 1890. Serial No. 362,201. (No model.)

*To all whom it may concern:*

Be it known that I, FRANCIS H. TREAT, of Chicago, Cook county, Illinois, have invented a new and useful Improvement in Billet-Conveyers, of which the following is a specification.

The object of my invention is to provide adjustable driving mechanism for a conveyer, primarily for a billet conveyer, having traveling rollers; and the invention consists in the features and combinations hereinafter described and claimed.

In the accompanying drawings, Figure 1 is a side elevation of a billet-conveyer containing my adjustable driving mechanism; and Fig. 2 a side elevation of a part of the conveyer, particularly showing such driving mechanism.

A is the conveyer; B, a sprocket-wheel for driving the conveyer; C, a radius-arm forming a bearing for the shaft of the sprocket-wheel; D, a spur-wheel secured to the shaft driving the sprocket-wheel, and $d$ a pinion-wheel with which the spur-wheel engages; E, the driving-shaft to which the pinion is secured; F, a shaft upon which the radius-arm is pivoted; G, a bed-plate having upright extensions forming bearings for the shafts E and F, and H an adjustable bridle-rod, one end of which is pivoted to the upper end of the radius-arm and the other to the frame-work of the billet-conveyer.

In the ordinary form of billet-conveyers the driving mechanism is at the end farthest from the shears, and the mechanism for taking up the slack in the chain at the end adjacent to the shears. It often happens that the power is not in convenient position to drive the conveyer from its farther end, and therefore desirable that it be driven from the shear end. In the latter case it is always desirable to provide for the adjustment or the taking up of the slack from the farther end, and to provide for this adjustment from the end adjacent to the shears, and at the same time for an adjustable driving mechanism is the object of my invention. Of course the adjustable driving mechanism is the important feature.

My improved driving mechanism consists, essentially, of a sprocket-wheel mounted in bearings at the end of an upright radius-arm, a shaft upon which the radius-arm is pivoted, and gear mechanism for operating the sprocket-wheel. The radius-arm is pivoted to a shaft at its lower end in such a way that it can be turned or oscillated from this pivotal point, as desired. The bridle-rod, secured to the radius-arm at its upper end, is adjustable by a sleeve-nut, and the lengthening or shortening of the bridle-rod operates to adjust or move the radius-arm and sprocket-wheel into different positions, the sprocket-wheel being mounted at the upper end of the radius-arm, as already mentioned. The shaft upon which the radius-arm is pivoted is mounted in bearings in line with the driving-shaft upon which the pinion is mounted for operating the spur-wheel and through it the sprocket-wheel and conveyer mechanism. The length of the radius-arm is preferably equal to one-half the sum of the diameter of the pinion and spur wheels, and this causes said two wheels to be always correctly in gear, no matter what position is given to the radius-arm. It is apparent that the adjustment of the radius-arm, moving it and the sprocket-wheel mounted at its upper end back and forth, will tighten or loosen the endless chain of the conveyer. It is therefore a very simple matter to take up the slack in the chain whenever desired by simply lengthening the bridle-rod and thus moving back and forth the upper end of the radius-arm with the sprocket-wheel mounted thereon, and, as already suggested, this can be done without disengaging or disarranging the pinion-wheels or otherwise interfering with their proper work or relation. As already stated, this adjustable mechanism may be placed at either end of the conveyer, as desired. This adjustable driving mechanism is especially applicable to billet-conveyers containing curves, as described in another application this day executed by me; but inasmuch as it may be used for other purposes than conveying billets I do not wish to be understood as limiting myself to its use in connection with such a conveyer or with any other form of billet-conveyer. On the contrary, I intend to use it wherever applicable for the purposes of taking up the slack in an endless chain.

I claim—

1. In combination with a conveyer having an endless chain, adjustable driving mechanism comprising a radius-arm, a sprocket-wheel mounted thereon, and mechanism for adjusting the arm and sprocket-wheel, substantially as described.

2. In combination with a conveyer having an endless chain, a radius-arm pivotally secured to a support at its lower end, a sprocket-wheel mounted on the upper end of the radius-arm, and a bridle-rod adjusted lengthwise by a sleeve-nut, substantially as described.

3. In combination with a conveyer having an endless chain, a spur and pinion wheel for operating the conveyer, a radius-arm one-half the length of the sum of the diameter of the spur and pinion wheels, a sprocket-wheel mounted on the upper end of the radius-arm, and mechanism for adjusting the arm and sprocket-wheel, substantially as described.

FRANCIS H. TREAT.

Witnesses:
EPHRAIM BANNING,
SAMUEL E. HIBBEN.